(12) United States Patent
Sotoodeh

(10) Patent No.: US 8,935,771 B2
(45) Date of Patent: Jan. 13, 2015

(54) SYSTEM, METHOD, AND COMPUTER SECURITY DEVICE HAVING VIRTUAL MEMORY CELLS

(75) Inventor: Mehdi Sotoodeh, Mission Viejo, CA (US)

(73) Assignee: SafeNet, Inc., Belcamp, MD (US)

( * ) Notice: Subject to any disclaimer, the term of this patent is extended or adjusted under 35 U.S.C. 154(b) by 1920 days.

(21) Appl. No.: 11/593,170

(22) Filed: Nov. 6, 2006

(65) Prior Publication Data
US 2008/0109661 A1    May 8, 2008

(51) Int. Cl.
G06F 21/00    (2013.01)
G06F 21/34    (2013.01)
G06F 21/79    (2013.01)

(52) U.S. Cl.
CPC ............. *G06F 21/34* (2013.01); *G06F 21/79* (2013.01)
USPC .............. 726/10; 713/189; 713/191; 713/193

(58) Field of Classification Search
USPC ......................................... 713/189, 191, 193
See application file for complete search history.

(56) References Cited

U.S. PATENT DOCUMENTS

| | | | | |
|---|---|---|---|---|
| 5,535,365 | A * | 7/1996 | Barriuso et al. | 711/155 |
| 6,523,119 | B2 * | 2/2003 | Pavlin et al. | 713/192 |
| 7,191,319 | B1 * | 3/2007 | Dwyer et al. | 712/228 |
| 2003/0115453 | A1 * | 6/2003 | Grawrock | 713/155 |
| 2003/0163711 | A1 * | 8/2003 | Grawrock | 713/189 |
| 2003/0217270 | A1 * | 11/2003 | Nakayama | 713/172 |
| 2004/0153715 | A1 * | 8/2004 | Spaeth et al. | 714/4 |
| 2005/0127188 | A1 * | 6/2005 | Mahalal | 235/492 |
| 2005/0177658 | A1 * | 8/2005 | Perrinot | 710/52 |
| 2007/0174618 | A1 * | 7/2007 | Nakano et al. | 713/171 |

* cited by examiner

*Primary Examiner* — Jeff Pwu
*Assistant Examiner* — Helai Salehi
(74) *Attorney, Agent, or Firm* — Drinker Biddle & Reath LLP

(57) ABSTRACT

A computer security system may include a removable security device adapted to connect to the input/output port of a computer. The security device may include: a random access memory (RAM) cell; and a processor. The security system may further include: at least one encrypted update packet stored remotely from the security device and adapted to modify the contents of the RAM cell; and a private key located on the security device and adapted to decrypt the update packet; and at least one of a device driver, a software application, and/or a library stored remotely from, and in communication with, the security device and adapted to cause the contents of the at least one cell to be switched out of the cell, stored remotely from the cell, and loaded back into the cell.

4 Claims, 5 Drawing Sheets

SYSTEM, METHOD, AND COMPUTER SECURITY DEVICE HAVING VIRTUAL MEMORY CELLS

BACKGROUND OF THE INVENTION

1. Field of the Invention

The present invention relates generally to computer security systems, and more particularly, to computer security systems including virtual memory cells.

2. Related Art

Computer security devices, such as security tokens, are used in the art for a variety of purposes. For example, computer security devices can be used to prevent software piracy by requiring the user of the software to insert a computer security device, such as a dongle, containing a key into an input/output port on their computer, such as a USB or parallel port. Computer security devices may also be used to provide secure communications by using various keys, such as encryption and decryption keys. However, computer security devices often present resource constraints, in that they contain a fixed amount of memory, and are therefore only able to store a limited number of keys. Therefore, there remains a need in the art for computer security devices that overcome the shortcomings of conventional solutions.

BRIEF SUMMARY OF THE INVENTION

In an exemplary embodiment, the present invention may be a computer security system, comprising: a removable security device adapted to connect to the input/output port of a computer, the security device including: at least one random access memory (RAM) cell; and a processor; at least one encrypted update packet stored remotely from the security device and adapted to modify the contents of the at least one cell; and a private key located on the security device and adapted to decrypt the update packet; and at least one of a device driver, a software application, and/or a library stored remotely from, and in communication with, the security device and adapted to cause the contents of the at least one cell to be switched out of the cell, stored remotely from the cell, and loaded back into the cell.

In another exemplary embodiment, the present invention may be a method of providing a virtual cell on a security device coupled to a computer, the method comprising: receiving an update packet from a second software application while a first software application is using the security device, wherein the security device includes at least one RAM cell; storing a first context of the first software application remotely from the security device, wherein the first context includes a first unique session key and data specific to the first software application; generating a second unique session key with both the second software application and the security device; storing the second session key in the same location in RAM where the first session key was stored on the security device; and loading data specific to the second software application in the same location in RAM where the data specific to the first software application was stored on the security device.

In another exemplary embodiment, the present invention may be a computer security apparatus, comprising: an input/output port, adapted to be coupled to an input/output port of a computer; a processor; at least one random access memory (RAM) cell; and a read-only memory storing a unique private key; wherein, when coupled to the computer, the computer security apparatus is adapted to securely switch a context of a first software application from the RAM cell with a context of a second software application, and is adapted to perform a function based on a stored context, wherein a context includes a unique session key generated using the unique private key, and data specific to a software application.

In another exemplary embodiment, the present invention may be a method, including the steps of: obtaining an encryption key for a security device, wherein the security device includes random access memory; creating at least one update packet comprising at least one of: an instruction, an attribute, data, and/or a type of virtual cell; encrypting the at least one update packet using the encryption key; and providing the encrypted update packet to a software application, wherein the encrypted update packet allows the software application to write into the memory of the security device Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
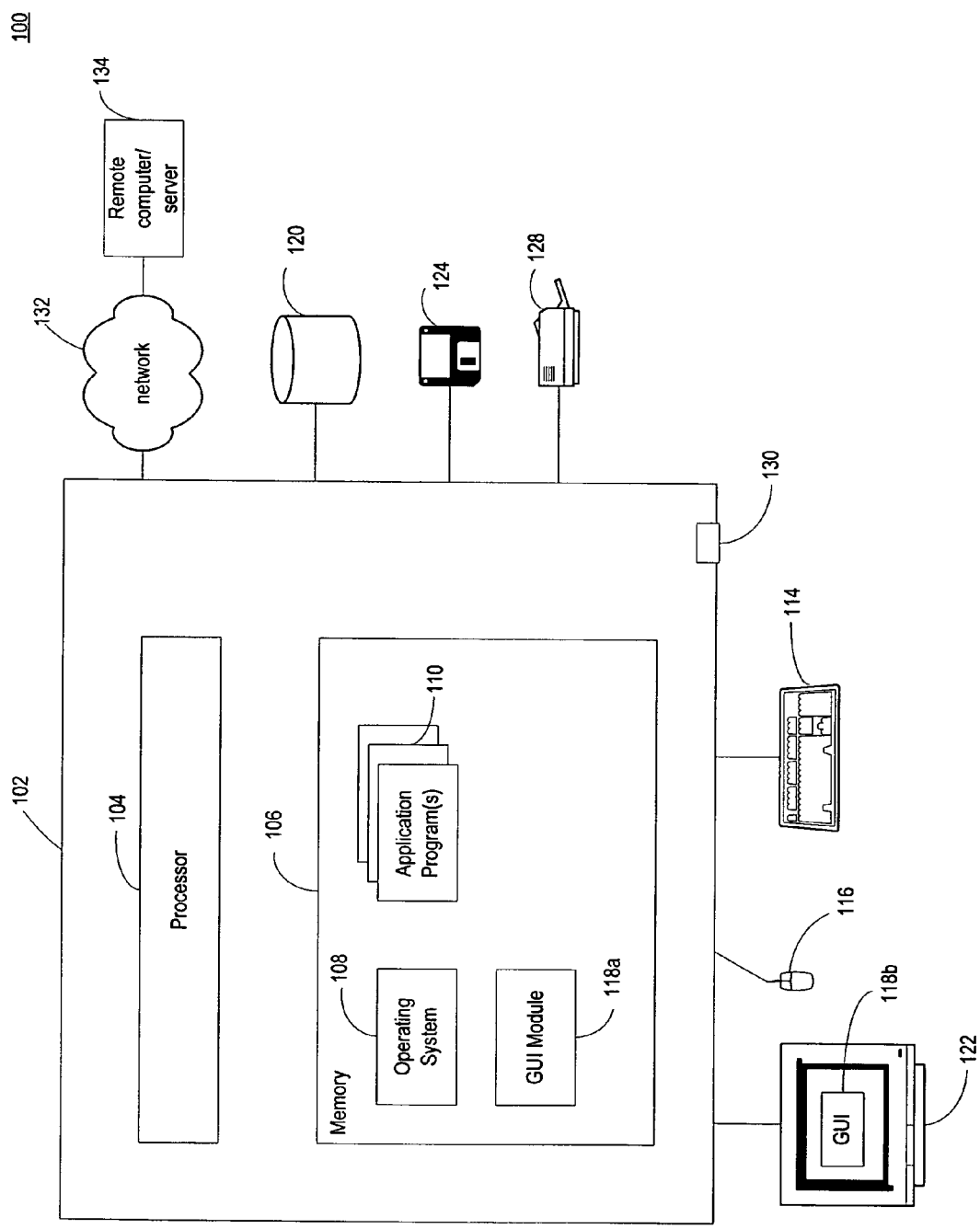
FIG. 1 is a diagram illustrating an exemplary hardware environment for practicing the present invention.

FIG. 1 illustrates an exemplary computer system 100 that can be used to implement the present invention. The computer 102 can comprise a processor 104 and a memory, such as random access memory (RAM) 106. The computer 102 can be operatively coupled to a display 122 that presents images such as windows to the user on a graphical user interface 118b. The computer 102 may be coupled to other devices, such as a keyboard 114, a mouse device 116, a printer 128, or other devices known in the art. One of ordinary skill in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118a. Although the GUI module 118a is depicted as a separate module, the instructions performing the GUI functions can be resident or distributed in the operating system 108, the computer application program(s) 110, or implemented with special purpose memory and processors. The computer 102 can also comprises an input/output (I/O) port 130. In one exemplary embodiment, the I/O port 130 may be a universal serial bus (USB) compliant port implementing a USB-compliant interface.

According to one exemplary embodiment, instructions implementing the operating system 108, and the computer program 110, can be tangibly embodied in a computer-readable medium, for example, data storage device 120, which can include one or more fixed or removable data storage devices, such as a zip drive, floppy disc drive 124, hard drive, CD-ROM drive, tape drive, etc. Further, the operating system 108 and the computer program 110 can comprise instructions which, when read and executed by the computer 102, cause the computer 102 to perform the steps necessary to implement and/or use the present invention. The computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132, such as a dial-up network, a wide area network (WAN), local area network (LAN), virtual private network (VPN), or the Internet. Program instructions for computer operation, including additional or alternative application programs, can be loaded from the remote computer/server 134. In one exemplary embodiment, the computer 102 implements an Internet browser, allowing the user to access the world wide web (WWW) and other internet resources.

One of ordinary skill in the art will recognize that many modifications may be made to the above-described configuration without departing from the scope of the present invention. For example, one of ordinary skill in the art will recognize that any combination of the above components, or any number of different components, peripherals, and other devices, may be used with the present invention.

In an exemplary embodiment, the present invention provides a virtual cell in a security device. A cell may be a collection of data, and attributes that control access to the data in the cell. A virtual cell, in an exemplary embodiment, may operate in a way that is somewhat analogous to virtual memory on a computer. The virtual cell may use the resources of the computer it is coupled to, to provide a device that appears to have an unlimited number of cells.

A virtual cell, in accordance with exemplary embodiments, may provide a plurality of functionalities. For example, a virtual cell may provide encryption/decryption, digital signature, data in a read/write or read-only format, key exchange, and/or counter functions.

An exemplary embodiment of the present invention may also provide a cryptographically secure method of updating the virtual cell. For example, an encrypted setup packet (alternately known as an update packet) containing commands, attributes, a type of cell, and/or data may be provided to a software application to enable the application to make use of the cell, while protecting the secrecy of the contents of the set-up packet. In an exemplary embodiment, an encryption key for the encryption packet may be known only to one or more authorized individuals, for example, a trusted vendor, and/or one or more authorized applications.

A device driver or library may provide the ability to switch contexts within the virtual cell from one software application to another without having to switch physical devices as described in more detail below.

Figure 2:
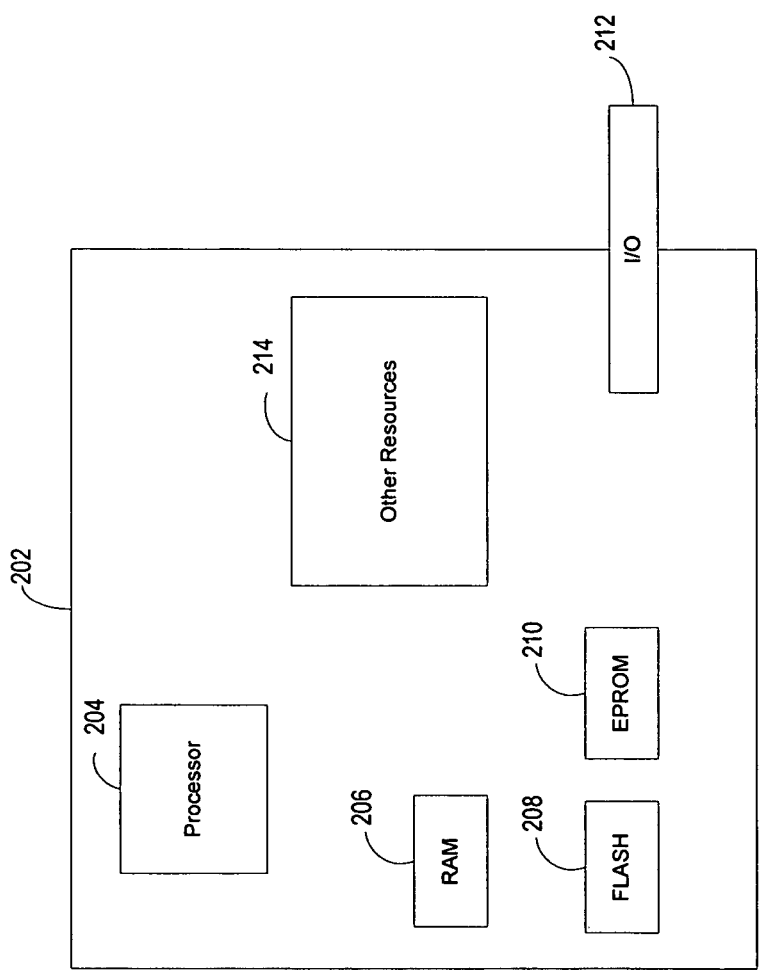
FIG. 2 depicts a block diagram of a security device according to an exemplary embodiment of the present invention.

FIG. 2 depicts a block diagram of a security device 202 according to an exemplary embodiment of the present invention. Security device 202 may contain a processor 204, and one or more forms of memory, including random access memory (RAM) 206, flash memory 208, and erasable programmable read only memory (EPROM) 210. Security device 202 may use one or more forms of memory as program memory for operations performed by security device 202 and for data memory used by the operations performed on the device. Security device 202 may be an external dongle that may be inserted into a port of a computer, such as, e.g. a parallel port or a universal serial bus (USB) port, and coupled to the computer via input/output port 212. In another embodiment, the security device may be coupled internally to a computer hardware interface via input/output port 212 and may not be readily removable without opening the computer case. Security device 202 may also have additional resources 214, such as, for example, crypto-keys, software to cause the processor to perform the functionality required by a virtual cell, an optional real-time clock, a co-processor, and/or one or more additional input/output ports (not shown).

Figure 3:
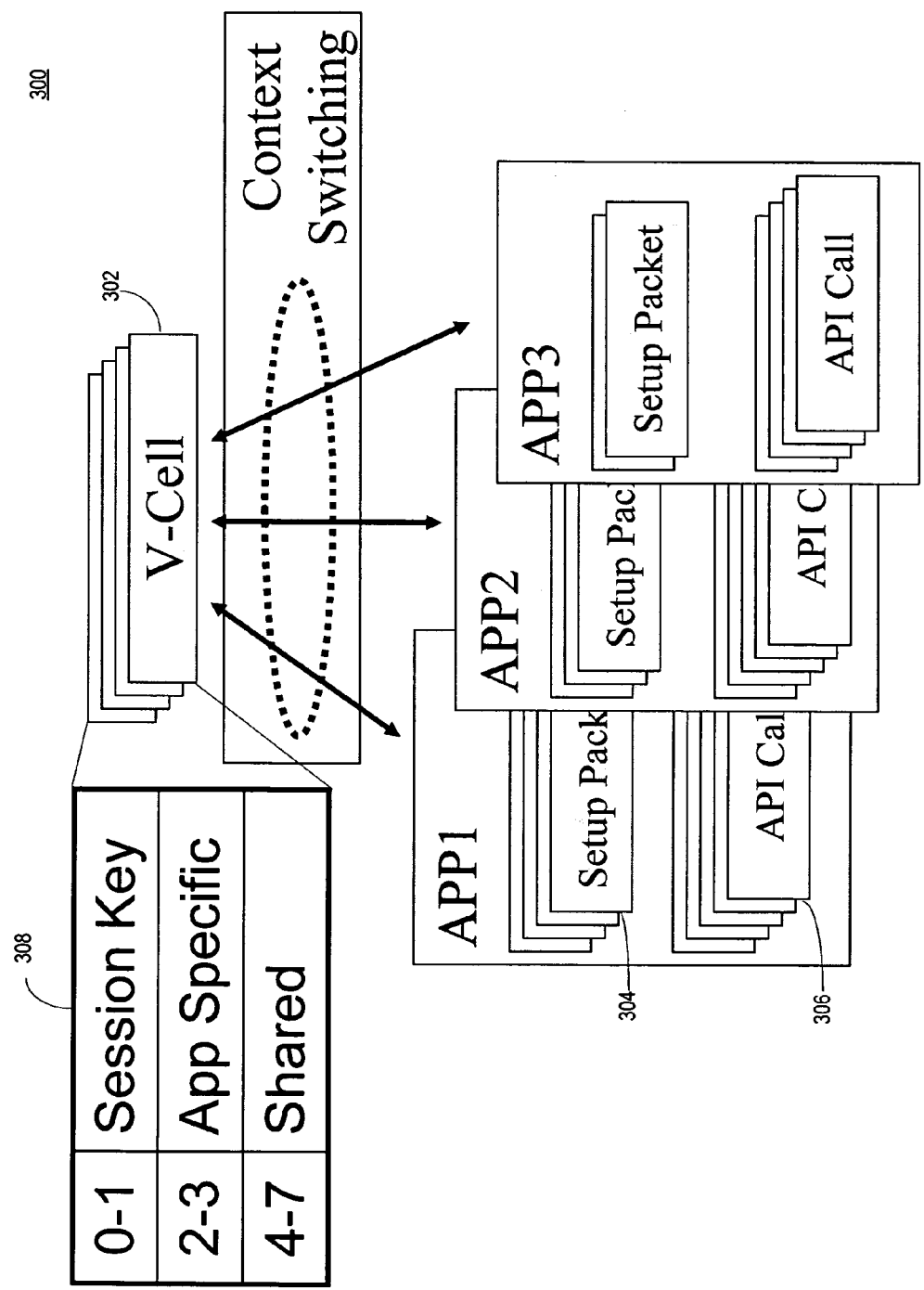
FIG. 3 depicts an example of context switching in an exemplary security device.

FIG. 3 depicts a block diagram 300 illustrating context switching within an exemplary embodiment of a group of virtual cells (v-cell) 302 on a security device. When a first application, APP1, makes use of v-cells 302, a first update/setup packet 304 loads the v-cell with data, such as, for example, an AES key. Update packets are described in further detail with reference to FIG. 4, below. Then APP1 may use an application program interface (API) call 306 to v-cell 302, for example, to encrypt or decrypt other data with the AES key.

When another application, APP2, gets control of the computer, code in a device driver for the security device may save the context of application APP1 externally from the security device, for example, on a storage medium in the computer. The context of the application in the v-cells may be the data and attributes used by the application, encrypted with a key unique for the token. When control is changed back to APP1, the device driver may then save the context of APP2 externally and load the context of APP1 back into v-cells in the security device.

In an exemplary embodiment, the security device may have eight virtual cells in RAM as shown in block 308. However, other embodiments may contain more or fewer virtual cells. In an exemplary embodiment, cells 0 and 1 may each be eight bytes in size, and may be used to store a sixteen byte unique session key, which is discussed further below. One skilled in the art can appreciate that cell and session key sizes may vary from this embodiment without departing from the invention. Cells 2 and 3 may be used to store application specific data, such as, for example, encryption keys. The contents of cells 0-3 are the context that is switched in and out of the security device. Other embodiments may use different configurations of number and size of the virtual cells on the security device, depending on the total amount of RAM on the device. Similarly, the virtual cells may be used for other purposes beyond those described herein.

When the data and attributes in use by an application are switched out of the security device, the switching may include encrypting the data and attributes with a unique key on the security device. The key may be randomly generated, for example, at the time of manufacturing, during device initialization or during device power-up. The encryption of the data and attributes with the security device's unique key may ensure that the context cannot be duplicated onto another security device.

Exemplary embodiments of the present invention may make use of update packets, also referred to as setup packets. Update packets may contain instructions, attributes, a type of cell, and/or data. Exemplary attributes may include: read/write, read-only, hidden, encrypt, decrypt, and/or sign. Exemplary cell types may include: data, counter, and/or encryption key.

Figure 4:
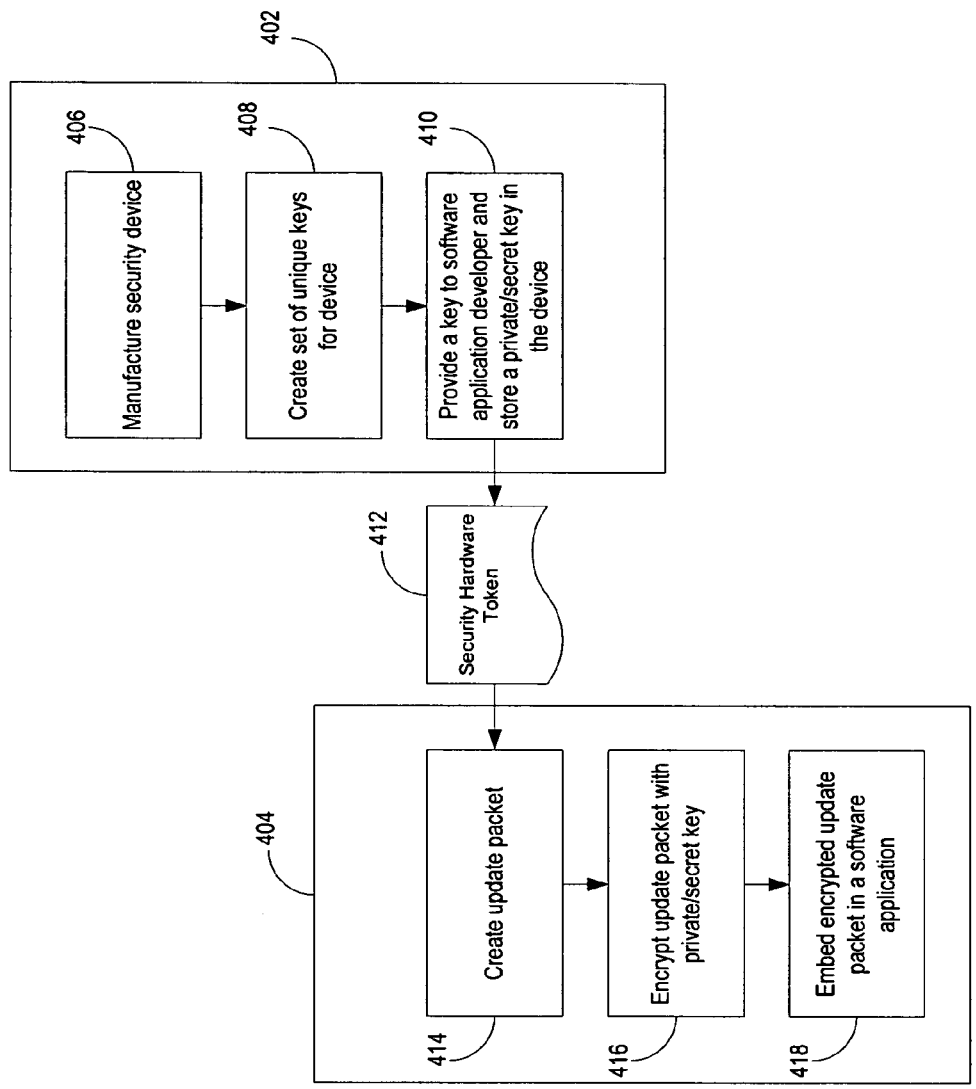
FIG. 4 is a flowchart depicting an exemplary method of creating an update packet according to embodiments of the present invention.

FIG. 4 depicts a flowchart 400 of an exemplary method of creating and providing secure update packets. In block 406, a security device according to embodiments of the present invention is manufactured by device manufacturer 402. In block 408, the device manufacturer 402 creates a key or set of keys unique to that device, for example, a public key and a private key, for example, for ECC or other asymmetric encryption, or a shared private/secret key for symmetric encryption, such as, for example, AES or DES encryption. Other encryption and signing keys may also be used. The set of keys may be provided in a security hardware token 412 to a software application developer 404, in block 410, while the private/secret key is stored on the device, for example, in read-only memory accessible only to the device's processor. The update packets may be created by the manufacturer of the security device 402, or by the software developer 404 in block 414. The update packets may be encrypted with the private/secret key in block 416. The encrypted update packet may then be embedded in, or otherwise provided to, a software application in block 418 to enable the software application to make use of the virtual cell on the security device.

In an exemplary embodiment, the software application does not "know" the contents of the update packet and cannot decrypt the packet. Instead, when the software application needs to use the virtual cell, it chooses the appropriate update packet and transmits the update packet to the security device. For example, the software application may need to use the virtual cell for encrypting data. An update packet for this purpose may contain data in the form of an AES encryption key, and an attribute enabling the virtual cell to be used in an encryption operation. In another example, the software application may need to use the virtual cell for a signing operation. An update packet for this purpose may contain data in the form of an asymmetric key, and an attribute enabling the virtual cell to be used for signing. The virtual cell then decrypts the update packet to obtain the contents and perform the relevant instruction, as indicated. In this way, while the manufacturer and the developer may know the encryption key(s), instructions, and other secret/proprietary information in the update packets, the end-user of the software application, or a malicious interceptor, cannot decrypt or otherwise gain access to the secret/proprietary information.

A session key may be generated by both a software application (or a driver or library used by the software application) on the computer and as well as by the security device. The software application (or a driver or library used by the software application) may generate a random number and perform some operation on the random number and a base point, to produce a value. The software application may then pass the value to the security device. The security device uses its own unique private key, which may be randomly generated and installed on the device prior to use, to create a session key from the passed value. Meanwhile, the software application may use the device's public key and the generated random number to generate the same session key.

Figure 5:
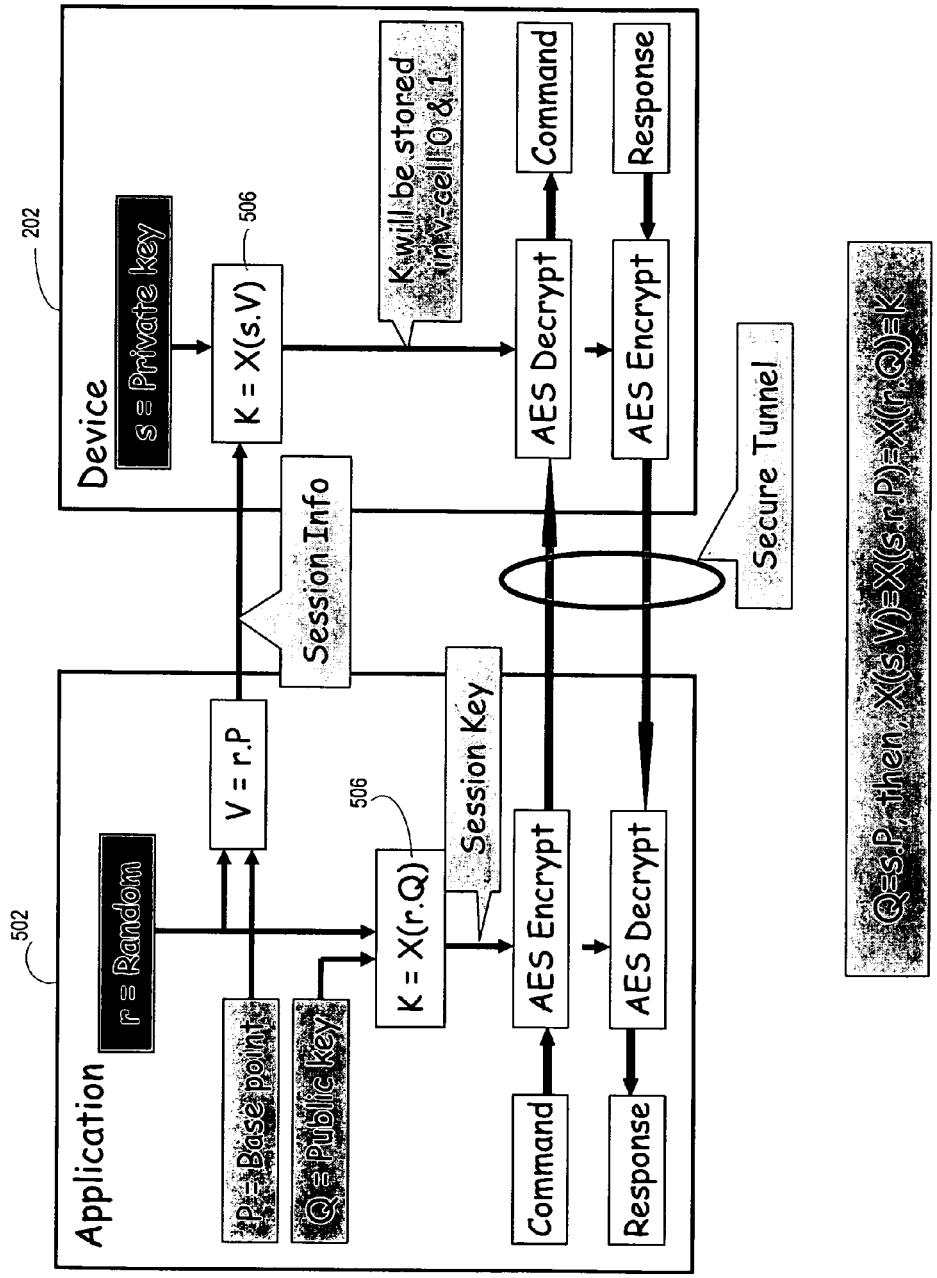
FIG. 5 is a block diagram illustrating the creation of a session key.

FIG. 5 is a block diagram 500 that illustrates the creation of a session key, for example, by using Elliptic Curve Cryptography (ECC). ECC is well-known in the art, and is described, for example, in U.S. Pat. No. 6,141,420. When ECC is used to create a session key, the base point P is a point (x,y) on an elliptic curve, i.e. a curve having the form $y^2=x^3+ax+b$, and V is another point on the same elliptic curve as P, selected by point multiplication r·P. The session key K 506 may then be generated by multiplying the point V with the private key s and calculating the x-coordinate of the resulting point. When an application 502 first connects to an exemplary security device 202, the application 502 may multiply a random number r with a base point P, to produce a point V. Application 502 may pass point V to the security device 202. Security device 202 may use its own unique private key s, which may be randomly generated and installed on the device 202, to create a session key K 506 from point V. Meanwhile, application 502 may use the device's public key Q, to generate the same session key K 506 from r, using the x coordinate of a point. Session key K 506 may then be stored in one or more v-cells.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of providing a virtual cell on a security device coupled to a computer, the method comprising:

encrypting storing by a processor of the computer security device first data used by a processor of the security device for an application running on the computer and residing, in a memory in the security device, storing the encrypted first data by a processor of the computer in a location remote from the security device, in response to an application context switch based on a need for the security device memory by a software application running on the computer;

storing by the processor of the computer second data in the memory of the security device;

thereafter, in response to a second application context switch, loading by the processor of the computer the remotely stored data back into the memory of the security device in the same memory location where it originally resided;

at the security device, performing encryption operations on data transferred between the security device and the computer, using a session key K generated at the security device by a method comprising:

receiving a value V generated by the software application, wherein V is generated by combining a random number r and a base point P; and combining V with a private key s of the device, wherein the combination results in the session key K; and at the computer, performing encryption operations on the data transferred between the security device and the computer, using the session key K generated at the computer by a method comprising:

generating r and obtaining a public key Q of the device, wherein Q is generated by combining s with P; and combining r with Q, wherein the combination results in the session key K.

2. The method of claim 1, further comprising:
receiving an application program interface (API) call from a software application while the first data is resident on the security device and executing a first function in the security device; and
receiving a second API call from a software application while the second data is resident on the security device and executing a second function in the security device.

3. The method of claim 1, wherein the base point is a point on an elliptic curve, and V is a different point on the elliptic curve; and wherein combining V with the private key comprises:
multiplying V with the private key and calculating an x coordinate of the multiplied point; and
wherein Q is another different point on the elliptic curve, and wherein combining r with Q comprises multiplying Q with r and calculating the x coordinate of the multiplied point.

4. The method of claim 2, wherein executing at least one of the first and second functions includes at least one of:
encrypting data on the security device, decrypting data on the security device, incrementing a counter, decrementing a counter, updating a device time, reading data from the device memory, signing data on the security device, and writing data to the device memory.

* * * * *